(12) United States Patent
Miyajima

(10) Patent No.: US 9,732,826 B2
(45) Date of Patent: Aug. 15, 2017

(54) CENTRIFUGAL PENDULUM VIBRATION CONTROL DEVICE

(71) Applicant: HONDA MOTOR CO., LTD., Tokyo (JP)

(72) Inventor: Toshiki Miyajima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/007,210

(22) Filed: Jan. 27, 2016

(65) Prior Publication Data

US 2016/0281816 A1   Sep. 29, 2016

(30) Foreign Application Priority Data

Mar. 23, 2015   (JP) .................. 2015-059135

(51) Int. Cl.
*F16F 15/14*   (2006.01)
(52) U.S. Cl.
CPC .................. *F16F 15/145* (2013.01)

(58) Field of Classification Search
CPC ......... F16F 15/14; F16F 15/145; F16F 15/131
See application file for complete search history.

(56) References Cited

FOREIGN PATENT DOCUMENTS

| DE | 846500 C | * | 8/1952 | ............ F16F 15/145 |
| DE | WO 2015149792 A1 | * | 10/2015 | ............ F16F 15/145 |
| JP | 2012-141018 | | 7/2012 | |

* cited by examiner

*Primary Examiner* — Thomas C Diaz
(74) *Attorney, Agent, or Firm* — Mori & Ward, LLP

(57) ABSTRACT

A centrifugal pendulum vibration control device for an engine includes an input member, a first link member, a first inertia mass body, a second link member, and a second inertia mass body. The input member is rotated by an engine. The first link member is rotatably connected to the input member. The first inertia mass body is supported on the input member via the first link member so as to perform pendulum motion. The second link member is rotatably connected to the first inertia mass body. The second inertia mass body is supported on the first inertia mass body via the second link member so as to perform pendulum motion. The input member and the second inertia mass body are coaxially disposed so as to be relatively rotatable.

12 Claims, 7 Drawing Sheets

NEUTRAL STATE

NEUTRAL STATE

WHEN ROTATED BY θ = 2 DEGREES

WHEN ROTATED BY θ = 4 DEGREES

FIG. 6A  NEUTRAL STATE
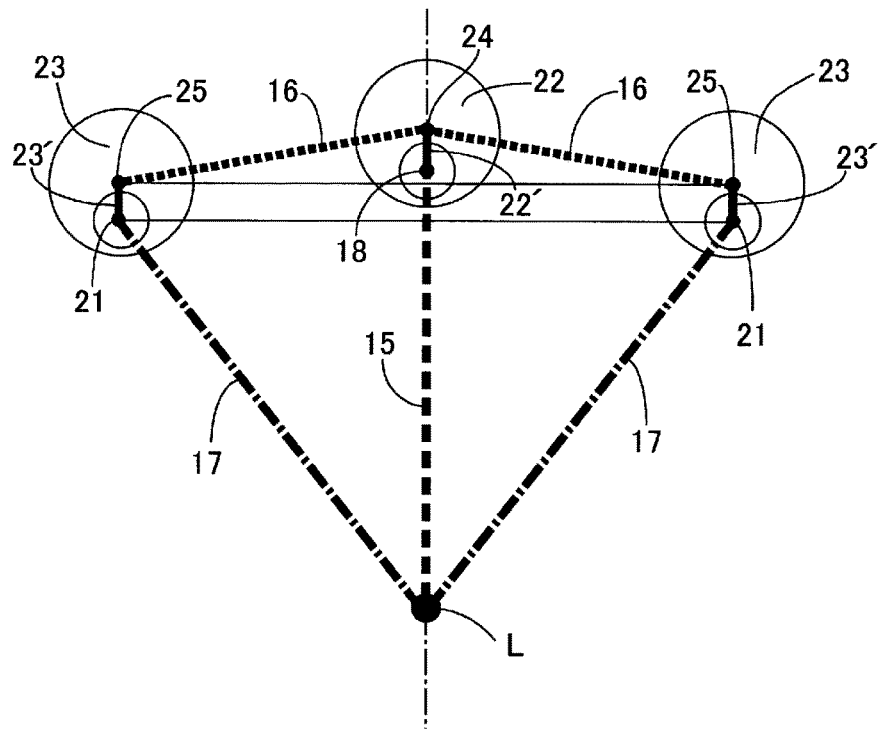
FIG. 6B  WHEN ROTATED BY θ = 4 DEGREES
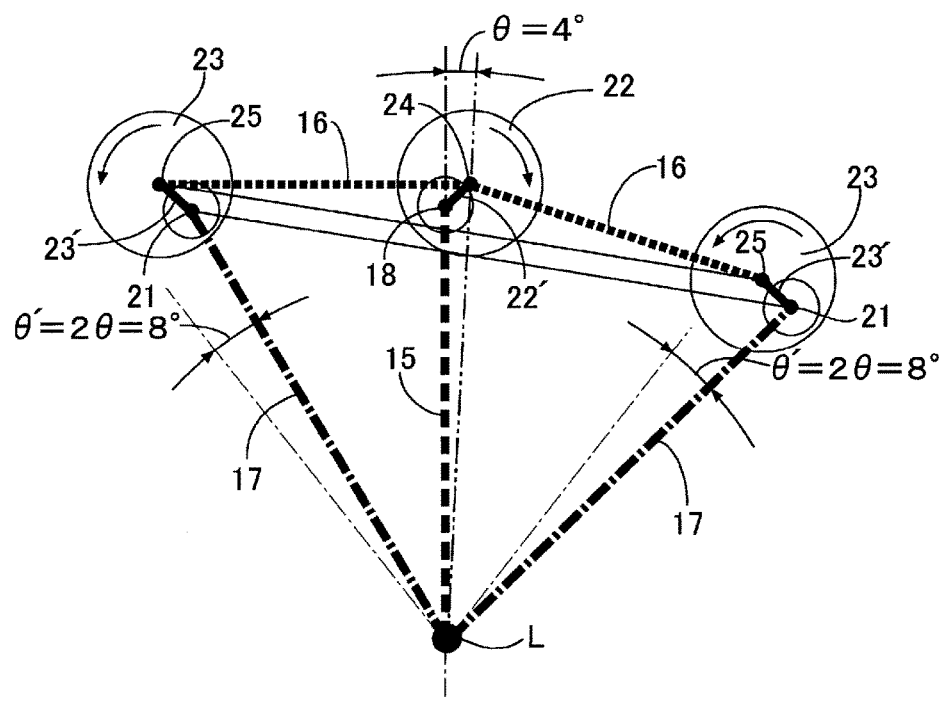

CENTRIFUGAL PENDULUM VIBRATION CONTROL DEVICE

CROSS-REFERENCE TO RELATED APPLICATIONS

The present application claims priority under 35 U.S.C. §119 to Japanese Patent Application No. 2015-059135, filed Mar. 23, 2015, entitled "Centrifugal Pendulum Vibration Control Device." The contents of this application are incorporated herein by reference in their entirety.

BACKGROUND

Field of the Invention

The present disclosure relates to a centrifugal pendulum vibration control device.

Description of the Related Art

According to Japanese Unexamined Patent Application Publication No. 2012-141018, there is known a centrifugal pendulum vibration control device in which four inertia mass bodies are supported on the outer circumference of a supporting member via two arm members in such a manner that the supporting member, the inertia mass bodies, and the two arm members form a parallel four-bar link whereby the inertia mass bodies are translated along a circular-arc path in relation to the supporting member.

SUMMARY

According to one aspect of the present invention, provided is a centrifugal pendulum vibration control device that is disposed between an engine and a transmission and that controls vibrations resulting from rotation fluctuation of the engine, which includes an input member rotated by the engine, a first inertia mass body supported on the input member via a first link member so as to be capable of pendulum motion, and a second inertia mass body supported on the first inertia mass body via a second link member so as to be capable of pendulum motion, in which the input member and the second inertia mass body are coaxially disposed so as to be relatively rotatable.

According to another aspect of the present invention, a centrifugal pendulum vibration control device for an engine includes an input member, a first link member, a first inertia mass body, a second link member, and a second inertia mass body. The input member is rotated by an engine. The first link member is rotatably connected to the input member. The first inertia mass body is supported on the input member via the first link member so as to perform pendulum motion. The second link member is rotatably connected to the first inertia mass body. The second inertia mass body is supported on the first inertia mass body via the second link member so as to perform pendulum motion. The input member and the second inertia mass body are coaxially disposed so as to be relatively rotatable.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIGS. 6A and 6B are diagrams explaining motions of a hub, a first inertia mass body, and a second mass body of a centrifugal pendulum vibration control device.

DESCRIPTION OF THE EMBODIMENTS

Figure 1:
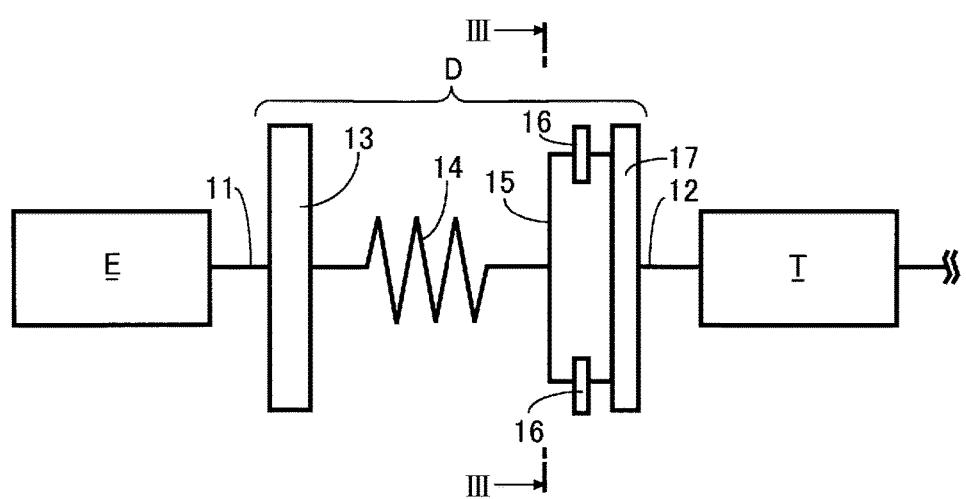
FIG. 1 is a schematic diagram of a damper disposed between an engine and a transmission.
Figure 2:
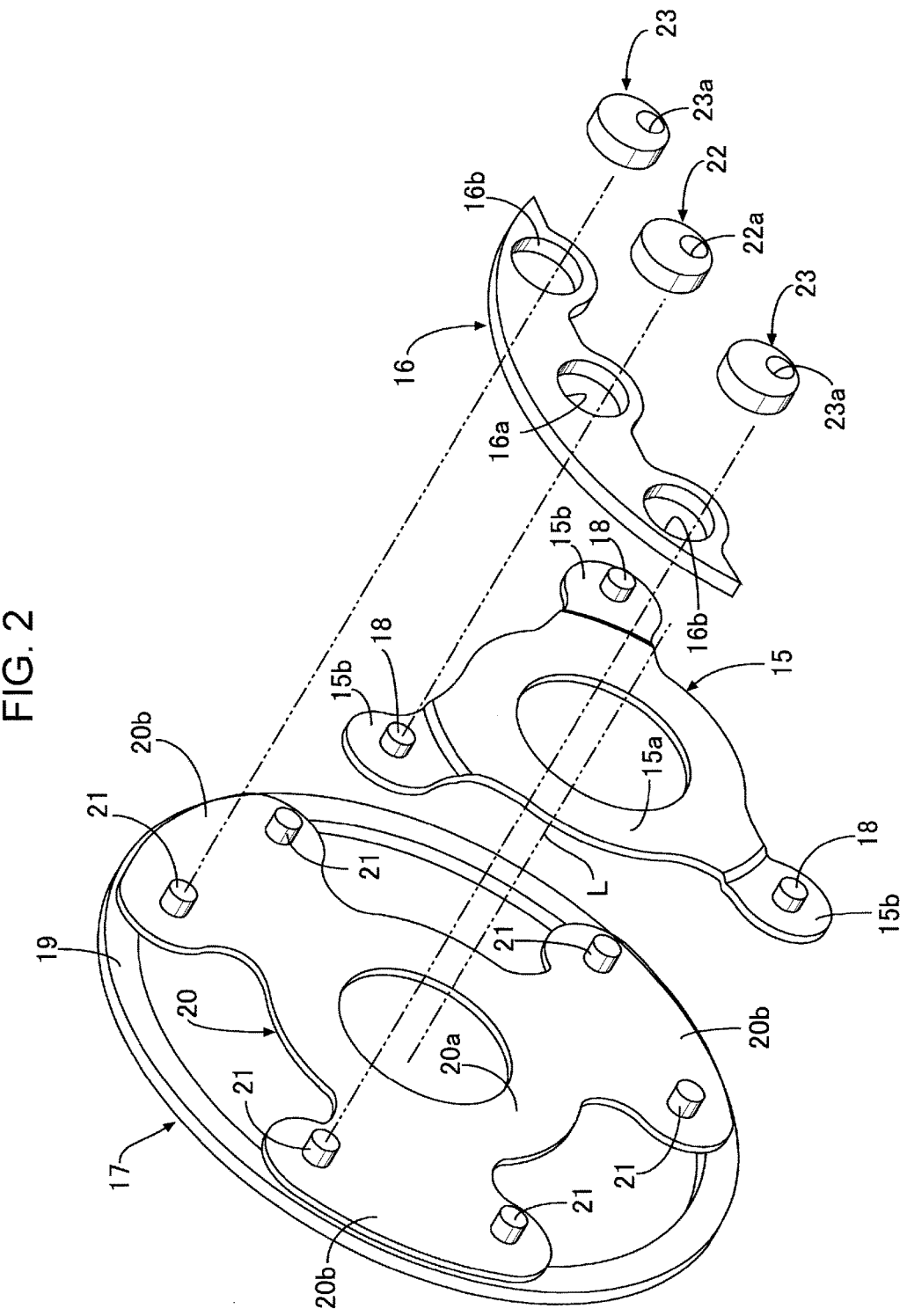
FIG. 2 is an exploded perspective view of a centrifugal pendulum vibration control device.

The embodiments will now be described with reference to the accompanying drawings, wherein like reference numerals designate corresponding or identical elements throughout the various drawings.

An embodiment of the present application will be described below with reference to FIGS. 1 through 7D.

As shown in FIG. 1, a damper D disposed between a crankshaft 11 of an engine E of a motor vehicle and a main shaft 12 of a transmission T of the motor vehicle includes a primary flywheel 13 connected to the crankshaft 11, a hub 15 connected to the primary flywheel 13 via a plurality of springs 14, three first inertia mass bodies 16, 16, and 16 connected to the hub 15 so as to be relatively rotatable in a circumferential direction, and a annularly-shaped second inertia mass body 17 that constitutes a secondary flywheel cooperating with the primary flywheel 13 and is connected to the three first inertia mass bodies 16, 16, and 16 so as to be relatively rotatable in the circumferential direction.

As shown in FIGS. 2 through 5, the hub 15 is formed by subjecting a metal plate to press working and includes an annularly-shaped support 15a and three arms 15b that project radially from the support 15a so as to be spaced away from one another by an angle of 120 degrees, each of the three arms 15b being implanted with a first pin 18. The second inertia mass body 17 includes an annularly-shaped mass member 19 made of a relatively thick metal plate and a supporting member 20 formed by subjecting a metal plate to press working. The supporting member 20 includes an annularly-shaped support 20a and three arms 20b that radially project from the support 20a so as to be spaced away from one another by an angle of 120 degrees. The three arms 20b are secured to side faces of the mass member 19 by means of welding or the like. Each of the three arms 20b is implanted at both ends thereof in a circumferential direction with two second pins 21, 21.

The substantially arc-shaped first inertia mass body 16 made of a relatively thick metal plate has a first circular through-hole 16a located at the center in the circumferential direction and two second circular through-holes 16b, 16b located at both ends in the circumferential direction. A disk-shaped first link member 22 is rotatably fitted into the first circular through-hole 16a of the first inertia mass body 16, while the first pin 18 of the hub 15 is rotatably fitted into a first pin through-hole 22a that is formed in the first link member 22 so as to be offset from the center. Likewise, two disk-shaped second link members 23, 23 are rotatably fitted into the two second circular through-holes 16b, 16b, respectively, while the two second pins 21, 21 of the second inertia mass body 17 are rotatably fitted into two second pin through-holes 23a, 23a, respectively, that are formed in second link members 23, 23 so as to be offset from the center.

The first link member 22 and the two second link members 23, 23 are the same members that are interchangeable with each other. When the three first inertia mass bodies 16, 16, and 16 are positioned in a neutral state shown in FIG. 3, the first pin 18 and the two second pins 21, 21 are phase-aligned with the centers of the first link member 22 and the two second link members 23, 23 in each of the three first inertia mass bodies 16, 16, and 16.

FIGS. 6A and 6B schematically show a structure of a centrifugal pendulum vibration control device according to this embodiment. The disk-shaped first link member 22 is pivotally supported at its center on the first inertia mass body 16 by a virtual pin 24 and is equivalent to one virtual rod-like link member 22' whose outer circumference is pivotally supported on the hub 15 by the first pin 18. Likewise, the disk-shaped second link members 23, 23 are pivotally supported at their centers on the first inertia mass body 16 by virtual pins 25, 25 and are equivalent to two virtual rod-like link members 23', 23' whose outer circumferences are pivotally supported on the second inertia mass body 17 by the second pins 21, 21.

The first inertia mass body 16 is equivalent to one rod-like link member that is bent at its center in the shape of a chevron. Also, the hub 15 is equivalent to one rod-like link member that is independently rotatable about an axis L. Furthermore, the second inertia mass body 17 is equivalent to one V-shaped link member that is independently rotatable about the axis L.

The two rod-like link members 23', 23', the first inertia mass body 16 connecting the two virtual pins 25, 25, and the second inertia mass body 17 connecting the two second pins 21, 21 form a parallel four-bar link.

FIG. 6A shows a state in which the first inertia mass body 16 and the second inertia mass body 17 are placed in a neutral position. When a rightward load indicated by an arrow in the figure is exerted on the first inertia mass body 16 in association with rotation fluctuation, the first link member 22 is rotated in the clockwise direction about the first pin 18 as shown in FIG. 6B, causing the first inertia mass body 16 to be swung rightward. When the first inertia mass body 16 is swung rightward, the rightward load is also exerted on the second inertia mass body 17 in association with the rotation fluctuation, causing the second inertia mass body 17 connected to the first inertia mass body 16 via the two second link members 23, 23 to also be rotated clockwise about the axis L in relation to the hub 15. At that time, the two second link members 23, 23 are rotated in the counterclockwise direction about the second pins 21, 21. On the other hand, when a leftward load is exerted on the first inertia mass body 16 and the second inertia mass body 17 in association with the rotation fluctuation, the first inertia mass body 16 and the second inertia mass body 17 are moved leftward, in contrast with the movement described above.

As described above, when the first inertia mass body 16 is swung over an angle of θ relative to the hub 15, the second inertia mass body 17 is swung in the same direction over an angle of θ relative to the first inertia mass body 16, causing a swing angle θ' of the second inertia mass body 17 relative to the hub 15 to be increased to 2θ that is two times the θ. FIG. 6B shows states for θ=4 degrees and θ'=2θ=8 degrees.

Figure 3:
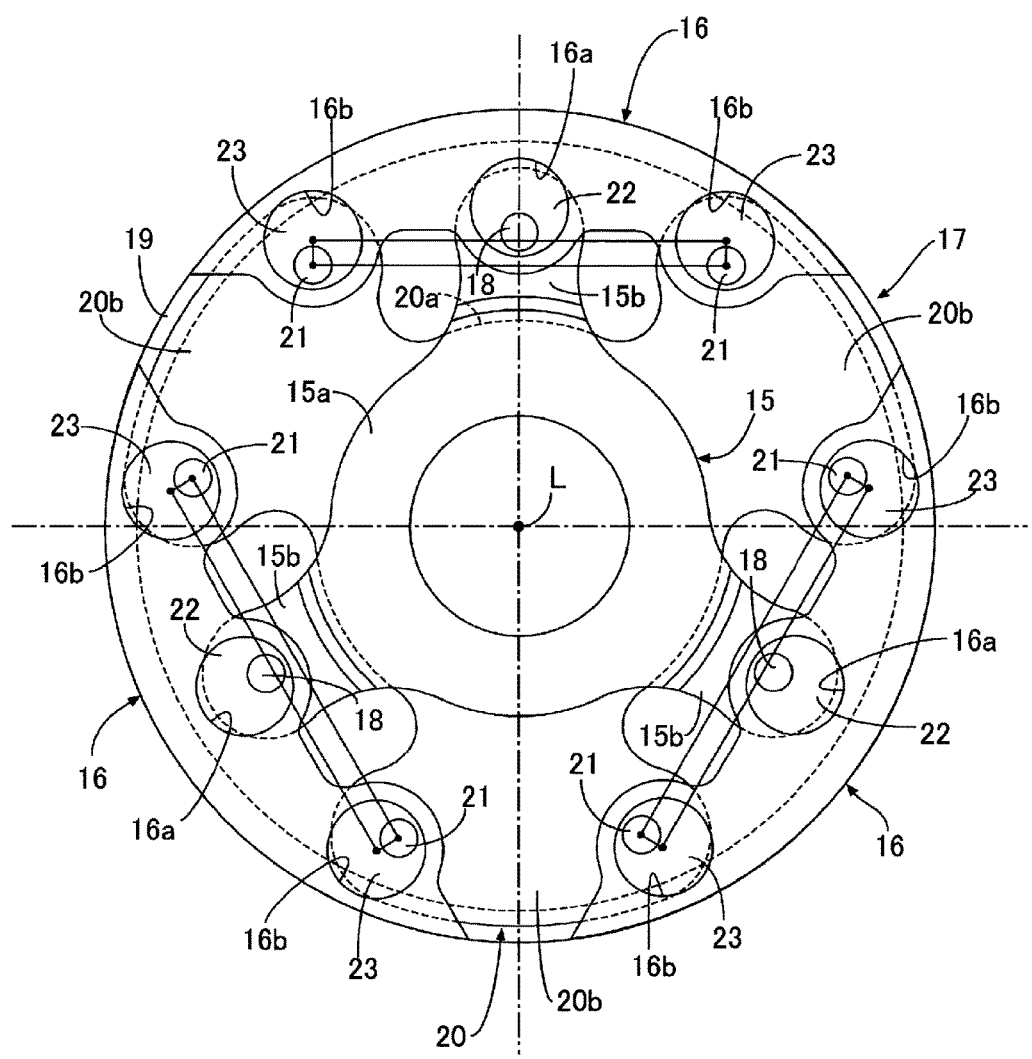
FIG. 3 is a view of section taken along line of FIG. 1.
Figure 4:
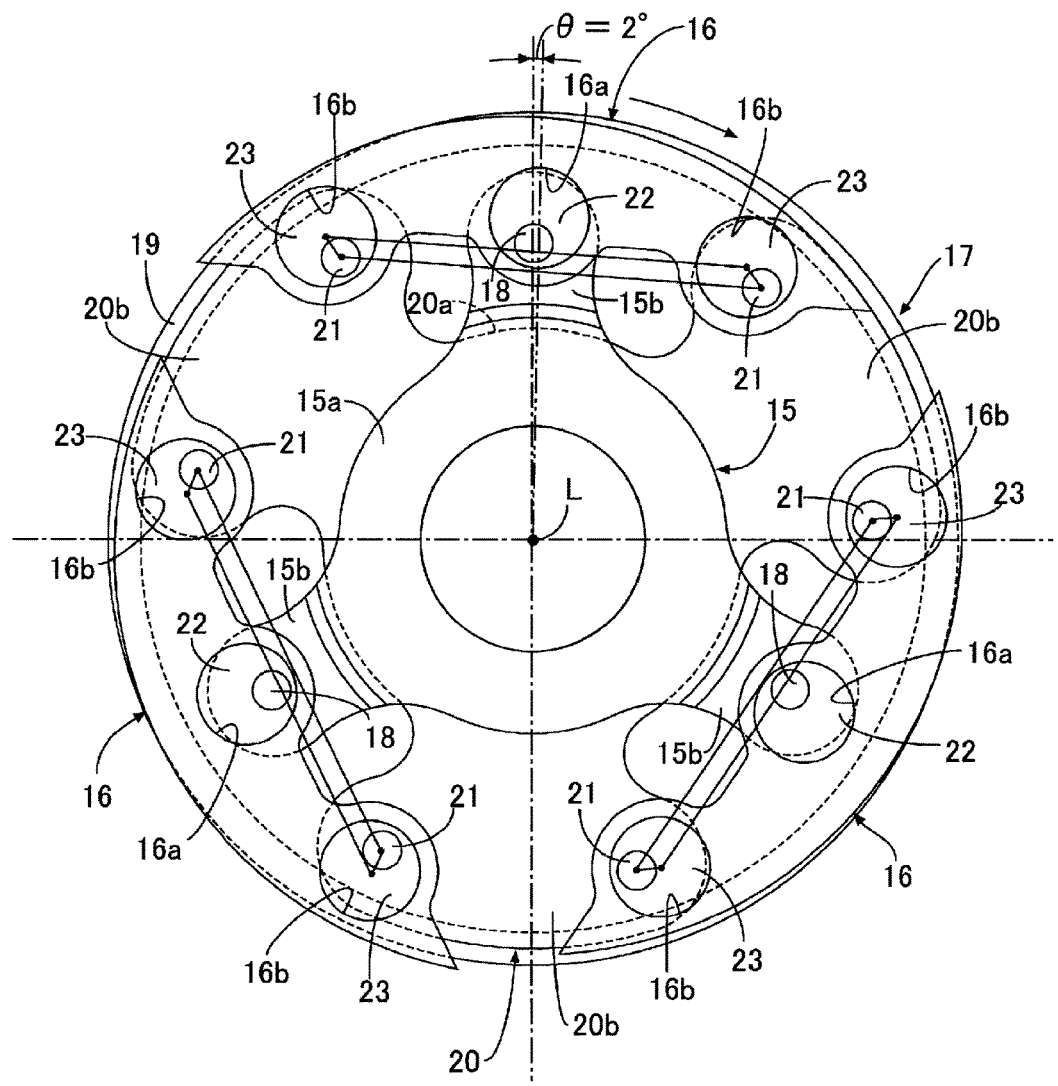
FIG. 4 is a diagram showing a state in which a second inertia mass body is rotated clockwise by two degrees relative to a hub in FIG. 3.
Figure 5:
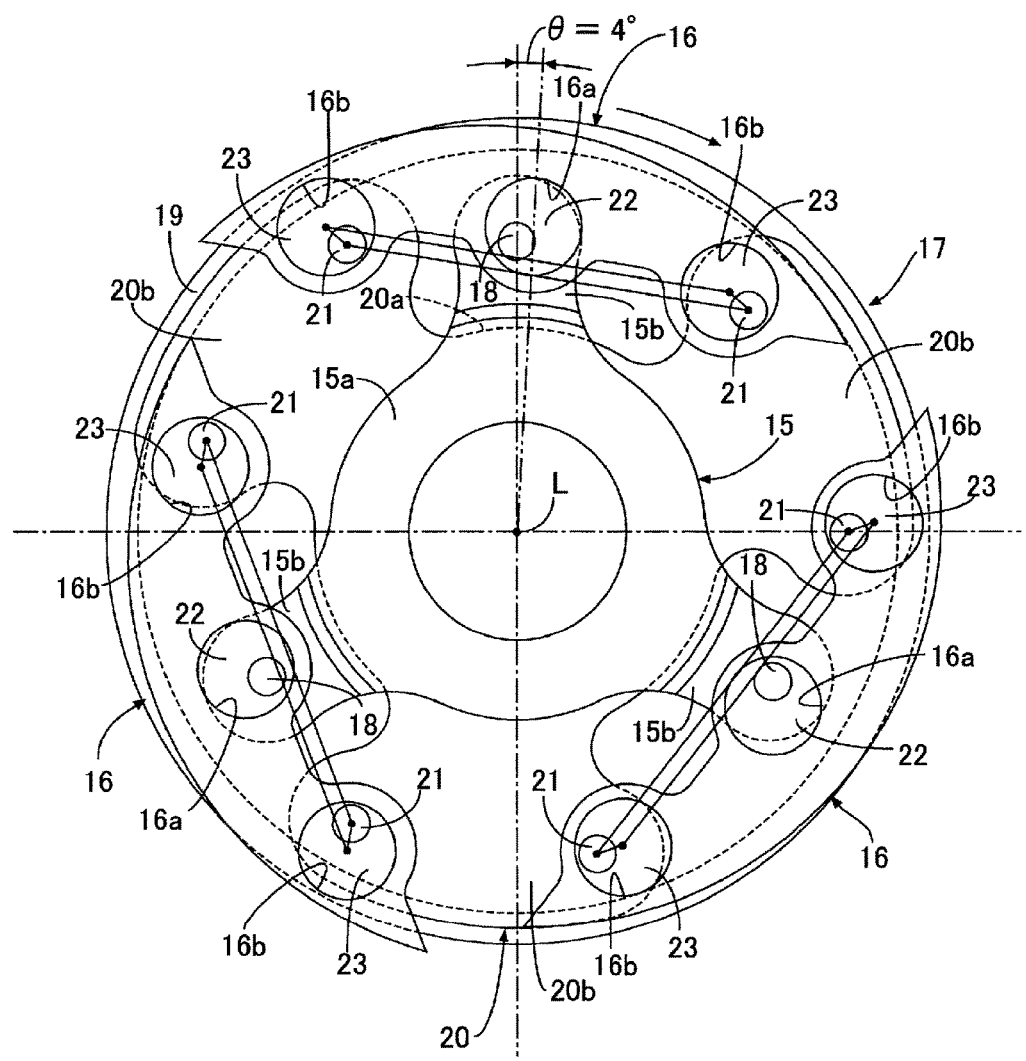
FIG. 5 is a diagram showing a state in which a second inertia mass body is rotated clockwise by four degrees relative to a hub in FIG. 3.

FIG. 3 is relative to FIG. 6A, showing that the first inertia mass bodies 16, 16, and 16 and the second inertia mass body 17 are placed in a neutral position (θ'=θ=0 degree), while FIG. 5 is relative to FIG. 6B, showing that the first inertia mass bodies 16, 16, and 16 are rotated in the clockwise direction by an angle of four degrees (θ=4 degrees) relative to the hub 15 and that the second inertia mass body 17 is rotated in the clockwise direction by an angle of eight degrees (θ'=2θ=8 degrees). FIG. 4 shows an intermediate state between a state of FIG. 3 and a state of FIG. 5 (θ=2 degrees, θ'=2θ=4 degrees).

Operation of an embodiment according to the present disclosure configured as shown above will be described below.

The crankshaft 11 of the engine E does not have a constant rotation angular velocity, which decreases during a period of a compression stroke of the engine and increases during a period of an expansion stroke, resulting in vibrations having frequencies proportional to engine speeds being generated. The vibrations of the crankshaft 11 are damped by means of expansion and contraction of the springs 14 disposed between the primary wheel 13 of the damper D and the second inertia mass body 17 that is the secondary flywheel and are also damped by means of pendulum movement of the first inertia mass bodies 16, 16, and 16 and the second inertia mass body 17.

A typical pendulum oscillates while biased downward in the vertical direction due to a gravitational force. In contrast, the first inertia mass bodies 16, 16, and 16 and the second inertia mass body 17 of the centrifugal pendulum vibration control device oscillate while biased outward in the radial direction by means of a centrifugal force. Matching the natural oscillation frequency of the first inertia mass bodies 16, 16, and 16 and the second inertia mass body 17 with the vibration frequency of the engine E to be damped can perform the function of vibration control as a dynamic damper.

Figure 7A:
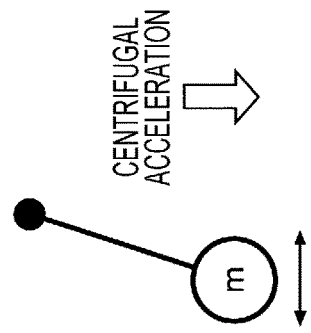
FIGS. 7A through 7D are schematic diagrams showing a concept of a centrifugal pendulum vibration control device.
Figure 7C:
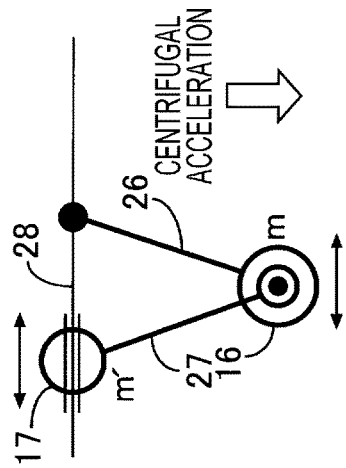
Figure 7B:
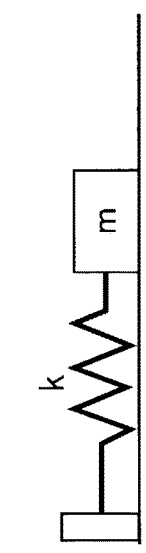

FIG. 7B shows a single-degree-of-freedom vibration system composed of a spring and a mass that replaces a simple pendulum of FIG. 7A. If the spring constant of the spring is named k and the mass of the mass is named m, the natural oscillation frequency of the pendulum is determined according to the length of the pendulum because the ratio of m to k is determined according to the length of the pendulum.

Figure 7D:
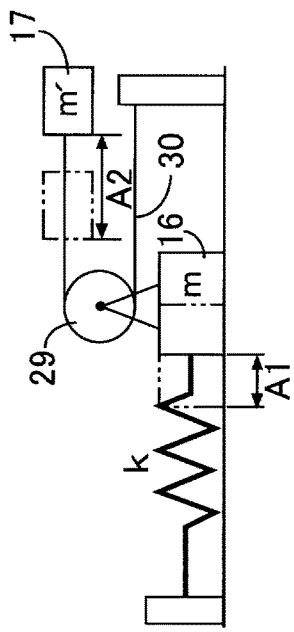

FIG. 7C shows a modeled double pendulum according to the embodiment, in which the second inertia mass body 17 is hung with an arm 27 from the first inertia mass body 16 that is hung with an arm 26 and the second inertia mass body 17 is oscillated along a guide 28. FIG. 7D shows a single-degree-of-freedom vibration system composed of a spring and two masses that replaces the double pendulum of FIG. 7C. The amplitude A2 of the second inertia mass body 17 is magnified by a pulley 29 and a string 30 to two times the amplitude A1 of the first inertia mass body 16. In this case, the natural oscillation frequency of the pendulum can be adjusted arbitrarily by adjusting the mass m' of the second inertia mass body 17.

For a coordinate system fixed to the hub 15, a simplified equation of angular motion (ignoring a velocity decay term) is:

$$I \cdot d\omega/dt = \tau - R \cdot F \cdot \sin\theta - R' \cdot F' \cdot \sin\theta'$$

where
I: Inertia mass of the hub 15;
ω: Rotation angular velocity of the hub 15;
M: Mass of the first inertia mass body 16;
R: Radius from the axis L to the mounting point (first pin 18) of the first inertia mass body 16;

R': Radius from the axis L to the mounting points (second pins 21, 21) of the second inertia mass body 17;
F: Centrifugal force resulting from the first inertia mass body 16 that is swinging;
F': Centrifugal force resulting from the second inertia mass body 17 that is swinging;
θ: Swing angle of the first inertia mass body 16 relative to the hub 15;
θ': Swing angle of the second inertia mass body 17 relative to the hub 15; and
τ: Torque applied to the hub 15 from the engine E.

The second term on the right-hand side of the above equation corresponds to a vibration control moment resulting from the first inertia mass body 16, while the third term on the right-hand side corresponds to a vibration control moment resulting from the second inertia mass body 17.

In the above equation, since the centrifugal force F is proportional to the mass M of the first inertia mass body 16 and the centrifugal force F' is proportional to the mass M' of the second inertia mass body 17, increasing the masses M, M' of the first inertia mass body 16 and the second inertia mass body 17 increases the vibration control moment, thereby enabling vibration control performance to be improved. In addition, increasing the radius R from the axis L to the mounting point of the first inertia mass body 16 and the radius R' from the axis L to the mounting point of the second inertia mass body 17 increases the vibration control moment, thereby enabling vibration control performance to be improved. However, increasing the vibration control moment by the method described above poses a problem of an increase in weight and size of the centrifugal pendulum vibration control device.

In this embodiment, the first inertia mass body 16 is supported on the hub 15 so as to be capable of pendulum motion and the second inertia mass body 17 is supported on the first inertia mass body 16 so as to be capable of pendulum motion, whereby, compared with the swing angle θ of the first inertia mass body 16, the swing angle θ' of the second inertia mass body 17 is magnified to two times θ or 2θ. Since any of the swing angle θ and the swing angle θ' is a sharp angle less than 10 degrees, sin 2θ becomes approximately two times sin θ, the vibration control moment resulting from the pendulum motion of the second inertia mass body 17 can be almost doubled without any increase in the mass M' of the second inertia mass body 17 or the radius R' of the mounting point of the second inertia mass body 17.

In addition, since the second inertia mass body 17 is larger than the first inertia mass body 16 in vibration control moment resulting from the same mass, the vibration control moment can be increased by reducing the mass of the first inertia mass body 16 and adding such a reduced amount of the mass to the second inertia mass body 17 without any increase in the total mass of the first inertia mass body 16 or the second inertia mass body 17.

Unlike a typical rod-like link member pivotally supported at both of its ends by a pair of pins, the first link member 22 is rotatably fitted into the first circular through-hole 16a formed in the first inertia mass body 16 and is pivotally supported at its portion offset from its center by the first pin 18 on the hub 15. In other words, the first link member 22 itself functions as one of a pair of pins, whereby the number of the pins can be halved which results in a reduction in the number of parts. In addition, the first link member 22 is housed inside the first circular through-hole 16a of the first inertia mass body 16, whereby the centrifugal pendulum vibration control device can be reduced in thickness in the axial direction and in size, compared with the typical rod-like link member that is disposed along the side of the first inertia mass body 16.

Likewise, the second link members 23, 23 are composed of disk-shaped members that are rotatably fitted into the second circular through-holes 16b, 16b formed in the first inertia mass body 16, whereby the number of parts can reduced. Consequently, the centrifugal pendulum control device can be reduced in thickness in the axial direction and in size for the same reason as the first link member 22.

The present application is typically described with reference to, but not limited to, the foregoing embodiments. Various modifications are conceivable within the scope of the present application.

For example, although the secondary flywheel of the damper D is used as the second inertia mass body 17 in the embodiment, the dedicated second inertia mass body may be provided.

In addition, the centrifugal pendulum vibration control device according to the present application is not necessarily provided on the damper D and may be provided away from the damper D.

Furthermore, the input member according to the present application is not limited to the hub 15 according to the embodiment.

The first link member 22 and the second link member 23 are not necessarily made of a disk-shaped member and may be composed of a typical rod-like link member.

Although the first pin 18 is integrated with the hub 15 and the second pin 21 is integrated with the second inertia mass body 17 in the embodiment, the pin 18 may be integrated with the first link member 22 and the second pin 21 may be integrated with the second link member 23.

Although the first link member 22 and the second link member 23 are members of the same shape that are interchangeable with each other in the embodiment, the members do not necessarily have the same shape.

The present application describes a centrifugal pendulum vibration control device that provides an enhanced vibration control capability without any increase in the mass or the swing radius of an inertia mass body.

A first aspect of the present application provides a centrifugal pendulum vibration control device that is disposed between an engine and a transmission and that controls vibrations resulting from rotation fluctuation of the engine, which includes an input member rotated by the engine, a first inertia mass body supported on the input member via a first link member so as to be capable of pendulum motion, and a second inertia mass body supported on the first inertia mass body via a second link member so as to be capable of pendulum motion, in which the input member and the second inertia mass body are coaxially disposed so as to be relatively rotatable. With this arrangement, if rotation fluctuation occurs in the input member, the first inertia mass body performs pendulum motion relative to the input member by means of a centrifugal force and the second inertia mass body performs pendulum motion relative to the first inertia mass body by means of a centrifugal force whereby a damping force for suppressing the rotation fluctuation can be generated. At this time, since the second inertia mass body performs larger pendulum motion than the first inertia mass body performing pendulum motion, a swing angle of the pendulum motion of the second inertia mass body is magnified compared with the swing angle of the pendulum motion of the first inertia mass body, thereby enabling the damping force to be increased without any increase in the mass or the swing angle of the second inertia mass body.

Furthermore, since the second inertia mass body having a larger swing angle can generate the damping force more effectively than the first inertia mass body having a smaller swing angle, the damping force can be increased by reducing the mass of the first inertia mass body and adding such a reduced amount of the mass to the second inertia mass body without any increase in the mass.

A second aspect of the present application provides the centrifugal pendulum vibration control device of the first aspect, in which the first link member may be a disk-shaped member that is rotatably fitted into a first circular through-hole formed in the first inertia mass body and is pivotally supported at a portion offset from its center by a first pin on the input member and in which the second link member may be a disk-shaped member that is rotatably fitted into a second circular through-hole formed in the first inertia mass body and is pivotally supported at a portion offset from its center by a second pin on the second inertia mass body. Unlike a typical rod-like link member pivotally supported at both of its ends by a pair of pins, each of the first and second link members themselves functions as one of a pair of pins, whereby the number of the pins can be halved which results in a reduction in the number of parts. In addition, the first and second link members are housed inside the first and second circular through-holes of the first inertia mass body, whereby the centrifugal pendulum vibration control device can be reduced in thickness in the axial direction and in size, compared with the typical rod-like link member that is disposed along the side of the first inertia mass body.

A hub 15 according to an embodiment corresponds to the input member according to the present application.

Obviously, numerous modifications and variations of the present invention are possible in light of the above teachings. It is therefore to be understood that within the scope of the appended claims, the invention may be practiced otherwise than as specifically described herein.

What is claimed is:

1. A centrifugal pendulum vibration control device that is disposed between an engine and a transmission and controls vibrations resulting from rotation fluctuation of the engine, comprising:
   an input member rotated by the engine;
   a first inertia mass body supported on the input member via a first link member so as to be capable of pendulum motion;
   a second inertia mass body supported on the first inertia mass body via a second link member so as to be capable of pendulum motion,
   wherein the input member and the second inertia mass body are coaxially disposed so as to be relatively rotatable, and
   wherein rotation of the input member relative to the second inertia mass body causes a rotation of the first link member in a direction opposite to a rotation of the second link member.

2. The centrifugal pendulum vibration control device according to claim 1, wherein
   a portion of the input member is sandwiched between the first inertia mass body and the second inertia mass body.

3. The centrifugal pendulum vibration control device according to claim 1, wherein
   the first link member is a disk-shaped member disposed inside a through-hole of the first inertia mass body.

4. The centrifugal pendulum vibration control device according to claim 3, wherein
   the second link member is a disk-shaped member that is interchangeable with the first link member.

5. A centrifugal pendulum vibration control device that is disposed between an engine and a transmission and controls vibrations resulting from rotation fluctuation of the engine, comprising:
   an input member rotated by the engine;
   a first inertia mass body supported on the input member via a first link member so as to be capable of pendulum motion;
   a second inertia mass body supported on the first inertia mass body via a second link member so as to be capable of pendulum motion,
   wherein the input member and the second inertia mass body are coaxially disposed so as to be relatively rotatable,
   wherein the first link member is a disk-shaped member that is rotatably fitted into a first circular through-hole formed in the first inertia mass body and is pivotally supported at a portion offset from its center by a first pin on the input member, and
   wherein the second link member is a disk-shaped member that is rotatably fitted into a second circular through-hole formed in the first inertia mass body and is pivotally supported at a portion offset from its center by a second pin on the second inertia mass body.

6. A centrifugal pendulum vibration control device for an engine, comprising:
   an input member rotated by the engine;
   a first link member rotatably connected to the input member;
   a first inertia mass body supported on the input member via the first link member so as to perform pendulum motion;
   a second link member rotatably connected to the first inertia mass body; and
   a second inertia mass body supported on the first inertia mass body via the second link member so as to perform pendulum motion, the input member and the second inertia mass body being coaxially disposed so as to be relatively rotatable, and
   wherein rotation of the input member relative to the second inertia mass body causes a rotation of the first link member in a direction opposite to a rotation of the second link member.

7. The centrifugal pendulum vibration control device according to claim 6, wherein
   a first swing angle of the pendulum motion of the second inertia mass body relative to an axis about which the input member rotates is larger than a second swing angle of the pendulum motion of the first inertia mass body relative to the axis about which the input member rotates.

8. The centrifugal pendulum vibration control device according to claim 6, wherein
   the centrifugal pendulum vibration control device is disposed between the engine and a transmission.

9. The centrifugal pendulum vibration control device according to claim 6, wherein
   a portion of the input member is sandwiched between the first inertia mass body and the second inertia mass body.

10. The centrifugal pendulum vibration control device according to claim 6, wherein
    the first link member is a disk-shaped member disposed inside a through-hole of the first inertia mass body.

11. The centrifugal pendulum vibration control device according to claim 10, wherein
the second link member is a disk-shaped member that is interchangeable with the first link member.

12. A centrifugal pendulum vibration control device for an engine, comprising:
an input member rotated by the engine;
a first link member rotatably connected to the input member;
a first inertia mass body supported on the input member via the first link member so as to perform pendulum motion;
a second link member rotatably connected to the first inertia mass body; and
a second inertia mass body supported on the first inertia mass body via the second link member so as to perform pendulum motion, the input member and the second inertia mass body being coaxially disposed so as to be relatively rotatable,
the input member comprising a first pin pivotally supporting the first link member,
the second inertia mass body comprising a second pin pivotally supporting the second link member,
the first inertia mass body having a first circular through-hole provided in the first inertia mass body and a second circular through-hole provided in the first inertia mass body,
wherein the first link member is a disk-shaped member that is rotatably fitted into the first circular through-hole and is pivotally supported at a portion offset from its center by the first pin, and
wherein the second link member is a disk-shaped member that is rotatably fitted into the second circular through-hole and is pivotally supported at a portion offset from its center by the second pin.

* * * * *